Sept. 13, 1932.  J. HARTNESS  1,877,307
TOLERANCE ZONE ON GAUGES
Filed Aug. 23, 1928
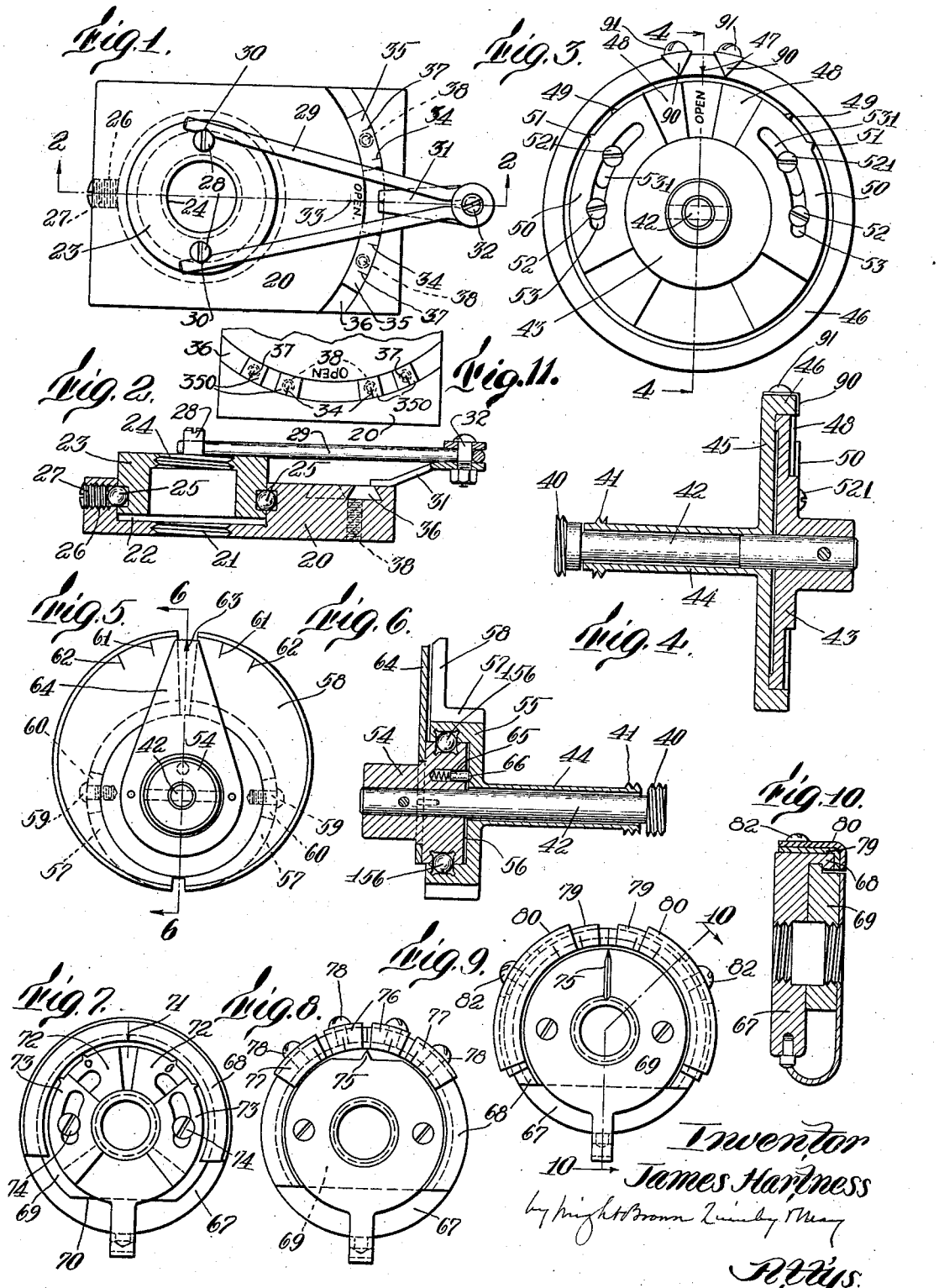

Patented Sept. 13, 1932

1,877,307

UNITED STATES PATENT OFFICE

JAMES HARTNESS, OF SPRINGFIELD, VERMONT

TOLERANCE ZONE ON GAUGES

Application filed August 23, 1928. Serial No. 301,616.

This invention has reference to gaging devices of a type including two relatively movable members which are capable of limited relative movement in gaging operation, the amounts or limits of such relative movement being the criterion of acceptability of the article being gaged. Gages of this general type for testing screw threads are illustrated and described in my copending application Serial No. 192,236, filed May 18, 1927, for thread gaging. As therein described such gages may comprise a pair of internally or externally screw-threaded members with threads so cut as to permit engagement with the maximum tolerated screw or minimum tolerated threaded aperture to be tested. These members are preferably arranged to be capable of relative motion when in engagement with a thread to be tested, the amounts of such relative motion in opposite directions from an "open" position, wherein the threads of the two gage members lie in a common helix, being determined by characteristics of the tested thread, and being indicated by an index mark or element on one of the members in its relation to adjacent marks or elements on the other member. One of the marks on the latter member may be located to indicate the "open" position of the gage, the other marks being angularly spaced therefrom. A pair of marks may be employed on each side of the "open" position mark, the marks of each pair being located to indicate the minimum and maximum movement the index can have from the open position when the gage is in threaded engagement with a screw thread which is within the limits of tolerance for its class. Each of the pairs of marks may therefore be said to define a zone of tolerance, since in the use of the gage, a tested screw is to be accepted if the index stops within both zones when the members are relatively rotated back and forth when in engagement with the screw to be tested, and is to be rejected if the index stops outside of either zone. Gages of this kind may be calibrated in several ways according to the nature of the desired information concerning the threads tested. For convenience in testing screw-threaded articles, zones of tolerance may be indicated on such gages within which the limits of relative motion of the gage members must fall when in operative engagement with a thread to be tested if such thread is to be found acceptable. Such zones may be greater or less according to the class of fit desired, that is, according to the degree of accuracy required for the thread. According to the present invention adjustable gage limits or boundaries are provided whereby the zones as a whole may be adjustably shifted with reference to the "open" position of the gage members, or with reference to each other, or whereby the individual limits of the several zones may each be independently moved so as to adjust not only the positions of the zones but also the size or extent thereof. Thus a single gage may be capable of testing threads for any desired one of a number of different classes of fit.

For a more complete understanding of the invention reference is had to the disclosure thereof in the following description and in the drawing, of which, Figure 1 is an elevation of a thread gage showing an embodiment of the invention.

Figure 2 is a section on the line 2—2 of Figure 1.

Figure 3 is an end elevation of another type of screw gage embodying the invention.

Figure 4 is a section on the line 4—4 of Figure 3.

Figure 5 is an elevation of a gage of the type shown in Figure 3, but with a modified embodment of the invention.

Figure 6 is a section on the line 6—6 of Figure 5.

Figures 7, 8 and 9 are elevations of gages showing various embodiments of the invention.

Figure 10 is a section on the line 10—10 of Figure 9.

Figure 11 is a fragmentary elevation of a modified form of gage.

Referring to the drawing in detail, the gage illustrated in Figures 1 and 2 is of a type designed for testing externally threaded objects such as bolts. This type of gage includes a body member 20 having a threaded hole 21 therethrough and a cylindrical recess 22 to receive a rotatable member 23 which is also provided with a threaded aperture 24. The gage member 23 is adapted to enter the recess 22 and to fit snugly against the side walls thereof in such a way that the threaded apertures 21, 24 are in line. In order to lock the member 23 against axial movement relative to the member 20, I may provide a ball bearing race by forming suitable grooves in the members to receive a set of ball bearings 25 which may be introduced through an opening 26 normally closed as by a screw plug 27. The ball bearings 25 permit free rotation of the gage member 23 relative to the member 20, but prevent or limit relative axial movement. The threads of the apertures 21, 24 are preferably made large enough to receive the largest tolerated screw to be tested. Thus, if a standard master gage is threaded through the apertures 21, 24 there will be a certain amount of looseness of fit therein when the gage member 23 is in such an angular position relative to the member 20 that the threads of the apertures 21, 24 lie in a common helix. This relative position between the members 20, 23 may be known as the "open" position. In order to facilitate setting the gage in its open position, suitable finger-pieces 28 may be mounted on the member 23 in such a way that the line between them will be substantially perpendicular to the long axis of the member 20, as shown in Figure 1.

I may also provide a spring handle 29 shaped somewhat like a hairpin. This handle is preferably provided with a pair of suitable notches 30 which fit against the sides of the finger-pieces 28 and are held thereagainst by the resilience of the handle 29. A suitable index member 31 may be secured at the bend of the handle 29 by any suitable means, such as a bolt 32 as shown. This index 31 may be extended in such a way as to cooperate with scale markings or other indicia on the body 20. The relatively long handle 29 magnifies the angular motion of the member 23 and facilitates reading the gage. The parts are preferably so shaped that when the index 31 is opposite a certain line or mark 33, the threads of the apertures 21, 24 will lie in a common helix and the gage will be in its open position ready to receive a screw to be tested.

In testing a screw, a master plug gage may be inserted in the gage in engagement with the threads of the apertures 21, 24. The handle 29 is then manipulated so as to rotate the gage member 23 as far as possible in both directions from the open position. The extent of such angular motion may be denoted by suitable lines 34. Rotational movement of the member 23 relative to the member 20 is limited when in engagement with a screw or plug gage by reason of the fact that such relative movement between the gage members causes an apparent axial advance of the thread 24 in one direction or another relative to the thread 21, although there may be no axial bodily movement of the member 23 relative to the member 20. This apparent relative movement between the threads of the gage takes up slack caused by the looseness of fit between the gage members and the screw to be tested, so that the threads 21, 24 come into binding engagement with the flanks of the screw thread in the gage. If a perfect thread is in the gage the limits of movement in opposite directions from the open position will be equidistant from the open position. If the thread tested has a lead error, the throws of the member 23 in opposite directions from the open position will be unequal. A screw having a pitch diameter less than standard or having thin flanks will, if free from lead error, permit a greater angle of throw than will the master plug gage. A screw having flanks thicker than normal or a pitch diameter greater than normal will permit only smaller angles of throw. The provision of a spring handle 29 engaging the finger pieces 28 is advantageous, since it prevents injury to the gage or thread to be tested from excessive jamming of the gage members. If excessive manual effort is applied to the handle 29 it will disengage itself from the finger pieces 28 before any harm is done.

In order to permit adjustability of the scale or zone marks 34 so as to enable an operator to keep the gage accurate, movable blocks 35 may be provided, according to the invention, these blocks, as shown, being fitted to slide in an arcuate undercut channel 36 cut in the face of the gage member 20. Set screws 38 may be provided to bear against the blocks 35 and to fix them in adjusted positions in the groove 36. Thus when a master gage, that is, a member having a standard thread hardened and ground to a high degree of accuracy, is inserted in the device and the gage member 23 is rotated as far as possible in either direction, the blocks 35 may be so adjusted as to bring the scale marks 34 into exact registry with the mark on the index 31. On the blocks 35 I also preferably provide additional marks 37 which, with the marks 34, define limits of tolerance for a given class of fit, each pair of marks 34, 37 thus defining a zone of tolerance within which the index 31 must register if the screw under test is to be accepted. These marks 37 may be located by calculation or may be determined experimentally by inserting a plug gage having a pitch diameter equal to the smallest pitch diameter tolerated for the class of fit desired. The marks 37 may thus be placed opposite limiting positions of the mark on the index 31. If it is desired to use the gage on a different job where another class of fit is required, the blocks 35 may be removed from the channel 36 and may be replaced by other blocks having marks corresponding to the different classes of fit. Thus by providing extra blocks 35 the gage may be used to test screws and taps for any class of fit desired. In place of the two blocks 35 I may employ four smaller blocks 350, one for each of the marks 34, 37, these blocks being separately adjustable, as indicated in Figure 11, to permit change of the extents as well as of the positions of the tolerance zones.

The gage illustrated in Figures 3 and 4 is of a type designed to test internal threads, that is, the threads of nuts or holes. For this purpose a pair of threaded elements 40, 41 may be provided as shown in Figure 4, the element 40 being mounted on a shaft 42 to which is attached a plate 43. The element 41 is mounted or formed on a hollow shaft 44 which surrounds the shaft 42 and is secured to or integral with a plate 45, the latter being preferably provided with a flange 46. The elements 40, 41 are preferably capable of entering a threaded bore having the smallest tolerable pitch diameter. The relative rotation of the threaded elements 40, 41 results in an apparent axial advance of one of the threads relative to the other, although the elements themselves, as shown in Figure 4, are preferably constructed so as to prevent bodily axial movement between them. This apparent axial advance between the threads 40, 41 takes up the slack or looseness of fit between the elements and a nut to be tested so that the elements come into binding engagement with the threads of the nut. In order to indicate the limiting angles of relative rotation of the elements 40, 41 suitable marks or other indicia may be mounted on the disk members 43, 45. These disks are preferably made as large as is convenient in order to magnify as much as possible the indicating movement of the marks. As shown in Figure 3 an index 47 may be formed on the front face of the rim 46. To cooperate with the index 47 suitable scale indicators may be formed or mounted on the disk 43. As shown a set of arcuate plates may be provided, two plates being arranged in superposed position on either side of the index 47. The under plates 48 may be provided with projecting pointers 49 or may be otherwise marked. The top plates 50 may be likewise provided with pointers 51 or with any suitable marking, each pointer 51 with a corresponding pointer 49 defining a zone of tolerance. Each pair of plates 48, 50 may be adjustably secured together by any suitable means. As shown, a screw 52 is provided. The threaded shank of the screw 52 passes through an arcuate slot 53 in the upper plate 50 and enters a threaded hole in the lower plate 48. The head of the screw 52 is wider than the slot 53 so that when the screw is set up the head bears on the upper surface of the plate 50 and binds it against the plate 48 so that the two are held together as a unit. This unit may then be moved about without altering the relative positions of the plates 48, 50 or of the points 49, 51. In order to anchor each of the units to the disk 43, an arcuate slot 531 may be provided in each plate 48, this slot being shorter than the slot 53 and adapted to register with a portion of it. A screw 521 is passed through both slots 53, 531 and enters a threaded hole in the disk 43. By this construction each unit, consisting of adjustably secured plates 48, 50 may be independently anchored to the disk 43 and may be adjusted relatively thereto. Thus the size of the tolerance zones may be set as desired by adjusting the pointers 49, 51 toward or away from each other, and the position of the zones may be altered without changing the size by adjustably moving the plates together without altering their angular relation one to the other.

Instead of two tolerance zones to cooperate with a single index as shown, I may provide a single zone to cooperate with two pointers. To this end a pair of markers 90 may be adjustably fixed as by set-screws 91 to one of the gaging members as shown in Figure 3. These markers indicate a single tolerance zone with adjustable boundaries. To cooperate with this zone, one of the pairs of pointers 49, 51 may be employed, the other pair being ignored or removed. The gage is operated as usual by turning the members relatively to the right and left as far as they will go when in engagement with a thread to be tested. When using a single zone, it is centrally located. The pointers 49 are on opposite sides of the zone when the gage is open, and spaced therefrom. When the gage is operated the pointers 49 move one after the other into the zone, if the thread tested is within the limits of tolerance. The combination of the single zone with two pointers is shown in Figure 3 by way of illustration. It is obvious that this combination can readily be used on the other forms of gages illustrated on the drawing. It is also obvious that if desired, the single zone may be located on the inner gaging member, the two pointers being located on the outer.

In order to calibrate this gage suitable ring gages may be employed. When a suitable master gage is in engagement with the elements 40, 41 the disk 43 may be rotated as far as possible in both directions from the open position, the pointer 49 being then adjusted to register with the index 47. A gage having the largest tolerated pitch diameter may then be brought into engagement with the elements 40, 41, the pointer 51 being adjusted to register with the index 47 when the disk 43 is turned as far as possible in opposite directions from the open position. If preferred, the pointers 49, 51 may be replaced by radial lines (similar to the lines 34 or 37 illustrated in Figure 1) marked on the plates 48, 50, or the edges of the plates themselves may be employed as indicators or tolerance zone limits. When the pointers 49 are used as index elements to cooperate with the single zone 90—90, the gage may be calibrated by successively using a standard ring gage and a ring gage having a thread with the largest tolerated pitch diameter to determine the correct size of the zone of tolerance between the pointers 90. These pointers are then adjusted so as to be symmetrically located on either side of the "open" mark 47. Then the positions of the pointers 49 are determined by rotation of the gage members when in engagement with the master ring gage.

Figures 5 and 6 show a gage of the type illustrated in Figures 3 and 4, this gage, however, differing from the other in certain details of structure. Threaded elements 40, 41 are mounted in such a way as to permit relative rotation thereof with little or no bodily axial relative movement. The element 40 is carried by a shaft 42 on which is mounted a member 54. The element 41 is mounted or formed on a hollow shaft 44 which is affixed to or integral with a cylindrical member 55 which is provided with a recess 56 to receive a portion of the member 54. In order to hold the members 54 and 55, and consequently the elements 40, 41, against relative axial movement, the former may be suitably recessed to form a race to receive ball bearings 156. Mounted on the peripheral surface of the member 55 are a pair of arcuate members 57 having crescent-shaped flanges 58. These may be adjustably secured to the member 55, as by suitable set screws 59 extending through slots 60. On these flanges 58 may be inscribed suitable marks 61, 62 to indicate tolerance zone limits. Cooperating with these zone limit marks is an index 63 on a suitable arm 64 secured in any desired manner to the member 54. The flanges 58 are preferably adjusted so that the marks 61 are equidistant from the index 63 when the gage is in its open position. The arcuate extent of the tolerance zones defined by the marks 61 and 62 may be found by calculation or by the use of two ring gages having respective threads with pitch diameters of limiting magnitude. The zones of correct size having been indicated by making the marks 61 and 62, the distance of the marks 61 from the open position of the index 63 may be determined by the use of a master thread gage as hereinbefore described. In order to retain the gage releasably in its open position I may provide a spring pressed pin 65 in the member 54 mounted to project into a shallow recess 66 formed in the member 55.

Figure 7 illustrates a thread gage of a type similar to that shown in Figures 1 and 2. This gage consists of a ring 67 having an inwardly projecting flange 68, part of which is cut way to receive a screw gage ring 69. The latter is provided with a flat 70 which permits its insertion under the overhanging flange 68 by rotating the ring 69 to a position at right angles to that shown in Figure 7. When in the position shown in Figure 7 the ring 69 is retained in place by the flange 68. On the flange 68 a suitable index 71 may be provided. To cooperate with this index I may provide a set of plates 72, 73 adjustably secured to the face of the ring 69, as by suitable set screws 74. The edges of these plates 72, 73, or marks thereon, or points projecting therefrom, may be used to indicate the limits of tolerance zones after the manner described in connection with the gage illustrated in Figure 3. By suitably adjusting the plates 72, 73 the readings of the gage may be kept accurate and zones for any desired class of fit may be set up without the use of any different or additional parts. Instead of the adjustable plates on the inner ring 69 I may mount an index 75 on this member, the zone limit indicators being mounted on the member 67 as shown in Figure 8. According to this form of the invention, separate arcuate angle or channel plates 76, 77 may be mounted on the rim 68 of the gage member 67 and may be adjustably secured thereon, as by set screws 78.

This gage may be calibrated in the manner hereinbefore described by the use of suitable plug gages, the zones being adjustable not only as to position but as to size to take care of any desired class of fit.

Figure 9 shows a different modification of the invention. According to this form the index 75 is mounted on the member 69. The zone limits are indicated either by edges of or marks upon a pair of sets of nested arcuate angle or channel plates 79, 80, each set being adjustably secured in position, as by a set screw 82. This gage may be calibrated in a manner similar to that previously described.

It will be apparent to one skilled in the art that various modifications and changes can be made in the apparatus described and illustrated herein without departing from the spirit and scope of the invention. The embodiments of the invention shown and described are by way of illustration only and are not to be taken as limiting the invention defined by the following claims.

I claim:

1. In combination with a screw thread gage comprising a pair of threaded gaging members capable of limited relative gaging movement, a pair of indicating elements carried by one of said members and defining the limits of a tolerance zone for gaging movements, one of said elements being adjustable relatively to another to vary the extent of the zone defined thereby, both of said elements being together adjustably movable relatively to said carrying member without disturbing their mutual relative positions.

2. In combination with a gage comprising a pair of gaging members capable of limited relative gaging movement, an index on one said member, and means carried by the other of said members for indicating a pair of zones of tolerance for gaging movements of said members, said means being adjustable to cause said zones to be adjustably movable with respect to said carrying member without alteration of size of said zones.

3. In combination with a gage comprising a pair of gaging members capable of limited relative gaging movement in opposite directions from an "open" relative position permitting maximum clearance between the work and the gage members, an index on one of said gage members, and four indicating elements adjustably mounted on the other gage member, said elements being arranged to cooperate with said index and to define a pair of tolerance zones showing the acceptable limits of relative gaging movement of said members in both directions from said open relative position.

4. In combination with a screw thread gage having a pair of threaded members for threaded engagement with a screw thread to be tested, said members being capable of limited relative gaging rotation in opposite directions from an "open" position of maximum clearance between the gaging threads and the thread to be tested, an index on one said member, there being a mark on the other member to register with said index when the gage is in its "open" position, and a pair of limit indicators carried by said other member on each side of said mark and symmetrically spaced therefrom, each said pair of indicators being adjustably secured to said other member and defining a zone of tolerance for limits of gaging movements of said members when in threaded engagement with a thread to be tested.

In testimony whereof I haxe affixed my signature.

JAMES HARTNESS.